United States Patent Office 3,243,478
Patented Mar. 29, 1966

3,243,478
MIXTURE COMPRISING POLYAMIDE AND STYRENE ACRYLONITRILE COPOLYMER
Russell L. Seelig, Jr., New Haven, Conn., assignor to United States Rubber Company, New York, N.Y., a corporation of New Jersey
No Drawing. Filed Dec. 27, 1962, Ser. No. 247,490
5 Claims. (Cl. 260—857)

The present invention relates in general to a novel composition of matter comprising nylon and styrene-acrylonitrile copolymer resins compounded together, and more particularly concerns a novel homogeneous nylon composition resulting from the mechanical mixture of the molten polymers of nylon and styrene-acrylonitrile copolymer.

Nylon polymers are known generally to be very hygroscopic or water-absorbent materials. Nylon 66 (polyhexamethylene adipamide) is particularly and markedly affected by the absorption of even small amounts of water; the resulting dimensional and physical property changes are often highly undesirable. Other members of the polyamide family, such as nylon 6 (polycaprolactam), display a similar hygroscopic tendency, but to a lesser degree. The poor wet strength and dimensional instability of nylon in a humid environment decreases its utility generally and particularly as a molding component. Other known disadvantages of nylon are its high cost and low melt viscosity, the latter complicating fabrication of the material into extruded sections.

The present invention contemplates and has as its primary object the provision of a new composition of matter consisting primarily of nylon, yet displaying superior physical properties. More specifically, the object of this invention is to provide a composition having not only the desirable qualities of nylon, such as toughness, but also an improved wet strength, an increased dimensional stability, and a higher melt viscosity. A further object is to provide said superior composition at a reduced material cost.

Broadly speaking, the present invention comprises a homogeneous nylon blend of molecularly dispersed nylon and styrene-acrylonitrile copolymer resins. More specifically, the present invention consists of a new homogeneous composition of matter having between 75 and 99 parts by weight of nylon resin and, correspondingly, from 25 to 1 parts (based on a total of 100 parts of the two components) of styrene-acrylonitrile copolymer resin molecularly dispersed therewith.

Styrene-acrylonitrile copolymer resins are plastics with a rather specific composition and molecular weight range. The composition by weight of the bound monomers therein is from 65 to 80% styrene and correspondingly from 35 to 20% acrylonitrile; the molecular weight corresponds to an intrinsic viscosity (0.25 gram per 100 grams of solvent at 30° C.) in dimethyl formamide of from 0.5 to 1.2. The dried copolymer resin used in the examples, hereinafter for convenience called resin R, is made by standard emulsion polymerization techniques and has the following properties: (1) composition by weight is 71.5% styrene and 28.5% acrylonitrile; (2) melt-softening temperature range is 300–350° F.; (3) intrinsic viscosity in dimethyl formamide is 0.9. In the following examples all parts are by weight and tests so specified were run in accordance with the procedure specified in the ASTM (American Society for Testing Materials) designations noted.

EXAMPLE I

To determine the improved wet stability of the physical properties of the new composition of matter, 120 grams of resin R (as described above) and 900 grams of nylon 66 ("Zytel 101," a hexamethylenediamine-adipic acid polymer having a melt-softening temperature range of 475–500° F.) were blended in a plastics extruder at 550° F. The product was granulated, dried at 175° F. under 25 inch Hg vacuum for 16 hours, and injection molded into test specimens. Samples of the test specimens were conditioned to 50% relative humidity equilibrium by boiling in potassium acetate solution (125 parts by weight of potassium acetate per 100 parts of water) for 96 hours. These samples and pure nylon 66 samples were tested as molded (dry) and after conditioning as described in Table 1. The physical properties of the blend product are substantially more stable to water than the physical properties of pure nylon.

*Table 1*

|  | Nylon 66 | | Product | |
|---|---|---|---|---|
|  | As molded | Conditioned | As molded | Conditioned |
| Flexural strength, p.s.i. (ASTM D790–49T) | 15,550 | 6340 | 16,510 | 8550 |
| Flexural modulus, p.s.i. (ASTM D790–49T) | 400,000 | 150,000 | 400,000 | 200,000 |
| Hardness, Rockwell (ASTM D785–51) | R121 | R101 | R122 | R107 |
| Percent increase in weight due to water absorbed in 24 hours at 212° F. (for a ⅛ inch thick tensile bar) |  | 8.3 |  | 6.7 |
| Percent increase in thickness on soaking in water for 24 hours at 212° F. (based on a tensile bar with an original thickness of ⅛ inch) |  | 2.6 |  | 1.6 |

EXAMPLE II

To determine the effect of varying the amount of resin on the toughness or impact strength of resulting composition, varying amounts of resin R were compounded with nylon 66 as in Example I. The products were granulated, dried, injection molded into tests specimens, and conditioned to 50% relative humidity equilibrium as in Example I. Specimens containing 75, 90, 95 and 100% nylon all displayed an impact strength (unnotched Izod, ASTM D256–56) of over 67 ft.-lbs./in., whereas pure resin R displayed an impact strength just slightly greater than 2 ft.-lbs./in. The data show that nylon compounds containing up to 25% low cost styrene-acrylonitrile resin display an impact strength or toughness similar to that of the more costly pure nylon.

EXAMPLE III

To demonstrate the beneficial effect of adding resin R to nylon 6 (polycaprolactam), the ingredients described in Table 2 were melt mixed in an extruder. The resulting blends were granulated, dried, injection molded into standard ASTM test specimens, and moisture conditioned as in Example I. The data of Table 2 show that, compared with pure nylon 6, compounds of nylon 6 containing up to 25% of styrene-acrylonitrile copolymer display outstanding increases in tensile modulus and flexural strength as well as a desirable improvement in heat resistance. There is no apparent loss in impact strength.

*Table 2*
NYLON 6 BLENDS

| Nylon 6 (polycaprolactam) resin | 100 | 90 | 75 |
|---|---|---|---|
| Styrene-acrylonitrile copolymer (resin R) |  | 10 | 25 |
| Hardness, Rockwell (ASTM D785–51) | R88 | R86 | R99 |
| Charpy unnotched impact, ft.-lbs./in. (ASTM D256–56) | 65 | 65 | 65 |
| Tensile modulus, p.s.i. (ASTM D638–58T) | 80,000 | 100,000 | 150,000 |
| Flexural strength, p.s.i. (ASTM D790–49T) | 4610 | 5570 | 7300 |
| Deflection temperature, 264 p.s.i. load, ° F. (ASTM D648–56) | 122 | 128 | 172 |

It should be understood that the precise proportions of the materials utilized may be varied if desired without departing from the scope and spirit of the invention as defined in the appended claims. For example, the nylon and styrene-acrylonitrile resins may be melt mixed or co-extruded, so long as there is a mechanical mixture of the molten polymers to produce a homogeneous material. It should also be understood that pigments, fillers, and the like may be incorporated in my compositions prior to shaping into useful molded articles.

Having thus described my invention, what I claim and desire to protect by Letters Patent is:

1. A homogeneous mixture of a polyamide resin selected from the group consisting of polycaprolactam and polyhexamethyleneadipamide with a styrene-acrylonitrile copolymer resin containing from 65 to 90 percent by weight of bound styrene and, correspondingly, from 35 to 10 percent by weight of bound acrylonitrile, in relative proportions of from 75 to 99 parts by weight of said polyamide resin and, correspondingly, from 25 to 1 parts of said styrene-acrylonitrile copolymer resin.

2. A homogeneous mixture of polyhexamethyleneadipamide resin and styrene-acrylonitrile copolymer resin containing from 65 to 90 percent by weight of bound styrene and, correspondingly, from 35 to 10 percent by weight of bound acrylonitrile in relative proportions of from 75 to 99 parts by weight of said polyhexamethyleneadipamide and, correspondingly, from 25 to 1 parts of said styrene-acrylonitrile copolymer resin, based on a total of 100 parts of said mixture.

3. A homogeneous mixture of polycaprolactam resin and styrene-acrylonitrile copolymer resin containing from 65 to 90 percent by weight of bound styrene and, correspondingly, from 35 to 10 percent by weight of bound acrylonitrile in relative proportions of from 75 to 99 parts by weight of said polycaprolactam resin and, correspondingly, from 25 to 1 parts of said styrene-acrylonitrile copolymer resin, based on a total of 100 parts of said mixture.

4. The solid mixture comprising the cooled product of a molten mixture of claim 2.

5. The solid mixture comprising the cooled product of a molten mixture of claim 3.

References Cited by the Examiner

UNITED STATES PATENTS

| | | | |
|---|---|---|---|
| 2,550,650 | 4/1951 | Arnold | 260—857 |
| 3,033,813 | 5/1962 | Werner | 260—857 |
| 3,061,581 | 10/1962 | Rowland et al. | 260—857 |
| 3,134,746 | 5/1964 | Grabowski | 260—857 |

MURRAY TILLMAN, *Primary Examiner.*

P. LIEBERMAN, *Assistant Examiner.*